United States Patent
Yamane et al.

(10) Patent No.: US 10,311,313 B2
(45) Date of Patent: Jun. 4, 2019

(54) IN-VEHICLE PASSIVE ENTRY LIGHTING CONTROL SYSTEM

(71) Applicant: HONDA MOTOR CO., LTD., Tokyo (JP)

(72) Inventors: Katsuyasu Yamane, Utsunomiya (JP); Yasuhiro Konishi, Kawagoe (JP); Norio Terui, Utsunomiya (JP); Yuji Tsuchiya, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 150 days.

(21) Appl. No.: 15/334,522

(22) Filed: Oct. 26, 2016

(65) Prior Publication Data

US 2017/0124404 A1 May 4, 2017

(30) Foreign Application Priority Data

Oct. 28, 2015 (JP) .................................. 2015-212013

(51) Int. Cl.
*H04N 7/18* (2006.01)
*G06K 9/00* (2006.01)
(Continued)

(52) U.S. Cl.
CPC ............ *G06K 9/00805* (2013.01); *B60R 1/00* (2013.01); *G06K 9/00369* (2013.01);
(Continued)

(58) Field of Classification Search
CPC .............................. H04N 5/23293; B60R 1/00
(Continued)

(56) References Cited

U.S. PATENT DOCUMENTS

2012/0081915 A1* 4/2012 Foote .................... B60R 1/12
362/494
2012/0206050 A1* 8/2012 Spero .................... B60Q 1/04
315/152
(Continued)

FOREIGN PATENT DOCUMENTS

JP A-2009-143503 7/2009
JP A-2009-179121 8/2009
(Continued)

OTHER PUBLICATIONS

JP Office Action dated Sep. 25, 2018 from corresponding Japanese patent application No. 2015-212013 (with attached English-language translation).

*Primary Examiner* — Richard T Torrente
(74) *Attorney, Agent, or Firm* — Drinker Biddle & Reath LLP

(57) ABSTRACT

An in-vehicle equipment control system includes a mobile terminal configured to receive a request signal and transmit a response signal; and in-vehicle equipment having: an imaging part that images surroundings of the vehicle; an illumination part that radiates light; a transmission/reception part that periodically transmits a request signal to the surroundings of the vehicle and receive a response signal from the mobile terminal; an imaging controller that causes the imaging part to image an outside of the vehicle when the response signal is received by the transmission/reception part; an object recognition part that recognizes a presence of a hazardous object on the basis of the captured image; and an illumination controller that controls the illumination part to perform illumination in different ways when the hazardous object is recognized by the object recognition part and when the hazardous object is not recognized.

9 Claims, 11 Drawing Sheets

(51) Int. Cl.
  *B60R 1/00* (2006.01)
  *H04N 5/225* (2006.01)
  *H04N 5/232* (2006.01)
  *H04N 5/235* (2006.01)
  *G06K 9/20* (2006.01)

(52) U.S. Cl.
  CPC ......... *G06K 9/2027* (2013.01); *H04N 5/2256* (2013.01); *H04N 5/232* (2013.01); *H04N 5/2354* (2013.01); *H04N 5/23293* (2013.01); *H04N 7/183* (2013.01); *B60R 2300/605* (2013.01); *B60R 2300/8006* (2013.01)

(58) Field of Classification Search
  USPC ........................................................ 348/148
  See application file for complete search history.

(56) References Cited

U.S. PATENT DOCUMENTS

| | | |
|---|---|---|
| 2014/0218212 A1 | 8/2014 | Nykerk |
| 2014/0267415 A1* | 9/2014 | Tang ........................ G06T 11/60 345/633 |

FOREIGN PATENT DOCUMENTS

| | | |
|---|---|---|
| JP | A-2014-204361 | 10/2014 |
| JP | 2015-033897 A | 2/2015 |

* cited by examiner

A5  A4

IN-VEHICLE PASSIVE ENTRY LIGHTING CONTROL SYSTEM

CROSS-REFERENCE TO RELATED APPLICATION

Priority is claimed on Japanese Patent Application No. 2015-212013, filed on Oct. 28, 2015, the contents of which are incorporated herein by reference.

BACKGROUND OF THE INVENTION

Field of the Invention

The present invention relates to an in-vehicle equipment control system.

Description of Related Art

In the related art, a system of determining a position at which at least one user is present and a moving direction on the basis of an image obtained by imaging the outside of a vehicle, and controlling an illumination part to illuminate the determined position and the moving direction is known (for example, see Japanese Unexamined Patent Application, First Publication No. 2015-33897).

SUMMARY OF THE INVENTION

However, in the related art, since the illumination part simply illuminates the position or the moving direction of the user, there is no consideration of informing of the user regarding a hazardous object. For this reason, the user may not recognize the hazardous object.

One of the objects of an aspect of the present invention is to inform a user of the presence of a hazardous object in the vicinity of a vehicle.

In order to solve the above-mentioned problems and accomplish the above-mentioned purposes, the present invention employs the following aspects.

(1) An in-vehicle equipment control system according to an aspect of the present invention includes a mobile terminal configured to receive a request signal transmitted from a vehicle and transmit a response signal to the vehicle according to the received request signal; and in-vehicle equipment having: an imaging part configured to image surroundings of the vehicle; an illumination part installed at a fixed position of the vehicle and configured to radiate light; a transmission/reception part configured to periodically transmit a request signal to the surroundings of the vehicle and receive a response signal from the mobile terminal; an imaging controller configured to cause the imaging part to image an outside of the vehicle when the response signal is received by the transmission/reception part; an object recognition part configured to recognize a presence of a hazardous object on the basis of the image imaged by the imaging part; and an illumination controller configured to control the illumination part to perform illumination in different ways when the hazardous object is recognized by the object recognition part and when the hazardous object is not recognized.

(2) In the aspect of the above mentioned (1), the object recognition part may determine whether the hazardous object is recognized at a boarding/deboarding position of the vehicle, and the illumination controller may cause the illumination part to illuminate the boarding/deboarding position when a hazardous object is recognized by the object recognition part.

(3) In the aspect of the above mentioned (1) or (2), the in-vehicle equipment may further include a person recognition part configured to recognize a presence of a person who approaches the vehicle on the basis of the image imaged by the imaging part, and the object recognition part may perform processing of recognizing the presence of the hazardous object when a person who approaches the vehicle is recognized by the person recognition part.

(4) In the aspect of any one of the above mentioned (1) to (3), when a hazardous object is recognized by the object recognition part, the illumination controller may control the illumination part to perform illumination such that a user is able to discriminate a region in which the recognized hazardous object is present and a region in which the hazardous object is not present.

(5) In the aspect of any one of the above mentioned (1) to (4), the illumination part may be able to change a region that radiates light, and the illumination controller may control the illumination part to radiate light to a region except for the recognized hazardous object when the hazardous object is recognized by the object recognition part.

(6) In the aspect of any one of the above mentioned (1) to (5), the illumination part may have at least two light sources to illuminate different directions, and, when the hazardous object is recognized by the object recognition part, the illumination controller may control the illumination part to prohibit emission of the light source in a direction in which the hazardous object is illuminated and turn on other light sources among the light sources provided in the illumination parts.

(7) In the aspect of the above mentioned (5), the illumination part may be able to change a direction in which light is radiated, and, when the hazardous object is recognized by the object recognition part, the illumination controller may control the illumination part not to illuminate the hazardous object by changing a direction in which the illumination part illuminates.

(8) In the aspect of any one of the above mentioned (1) to (4), the illumination part may have at least a first emission part configured to emit light of a first wavelength and a second emission part configured to emit light of a second wavelength, and, when the hazardous object is recognized by the object recognition part, the illumination controller may control the illumination part to cause the first emission part to illuminate the hazardous object and cause the second emission part to illuminate other region.

(9) In the aspect of any one of the above mentioned (1) to (8), the object recognition part may extract a region where a position of the recognized hazardous object is disposed among a predetermined plurality of regions corresponding to each of boarding/deboarding positions of a plurality of doors provided in the vehicle, and, when at least one region the hazardous object is disposed is extracted by the object recognition part, the illumination controller may control the illumination part to perform illumination on the extracted region in a different way from a way performed on the non-extraction region.

(10) In the aspect of any one of the above mentioned (1) to (9), the hazardous object may be a puddle.

(11) In the aspect of any one of the above mentioned (1) to (10), the vehicle may perform communication with the mobile terminal at predetermined periods in a state in which connection to the mobile terminal is securely established, and the mobile terminal may have a display image that displays an image showing a position of the hazardous object on the basis of the communication result.

According to the in-vehicle equipment control system of the above mentioned (1), the illumination controller can inform the user of the presence of the hazardous object in the vicinity of the vehicle by controlling the illumination part to illuminate in different ways when the hazardous object is recognized by the object recognition part and when the hazardous object is not recognized.

According to the above mentioned (2), when the hazardous object is recognized at the boarding/deboarding position of the vehicle, the illumination controller can warn the user the presence of the hazardous object in the vicinity of the vehicle by causing the illumination part to illuminate the boarding/deboarding position.

According to the above mentioned (3), when a person who approaches the vehicle is recognized by the person recognition part, as the object recognition part performs processing of recognizing the presence of the hazardous object, the system can inform the user of the presence of the hazardous object in the vicinity of the vehicle more reliably. In addition, when no person is approaching the vehicle, useless processing can be omitted because the object recognition part does not perform processing of recognizing the presence of the hazardous object.

According to the above mentioned (4) to (7), as the illumination controller controls the illumination part to perform illumination such that the user can discriminate the region in which the recognized hazardous object is present and the region in which the hazardous object is not present, the user can be guided to approach the door of the vehicle while avoiding the hazardous object.

According to the above mentioned (8), as the illumination controller controls the illumination part to cause the first emission part to illuminate the hazardous object and cause the second emission part to illuminate the other region, the system can inform the user of the presence of the hazardous object and cause the user to note the presence of the hazardous object.

According to the above mentioned (9), since the object recognition part extracts the region in which the recognized hazardous object is disposed among the plurality of regions set to correspond to the boarding/deboarding positions of the plurality of doors provided in the vehicle, the illumination for the illumination parts installed at the doors of the vehicle can be controlled. As a result, the user can recognize whether the hazardous object is present at each of the boarding positions corresponding to the doors.

According to the above mentioned (11), information indicating a position of the hazardous object is displayed on a display image of the mobile terminal. Accordingly, since the system can enable the user to recognize the position of the puddle in advance, convenience for the user can be improved.

DETAILED DESCRIPTION OF THE INVENTION

Hereinafter, an embodiment of an in-vehicle equipment control system of the present invention will be described with reference to the accompanying drawings.

First Embodiment

Figure 1:
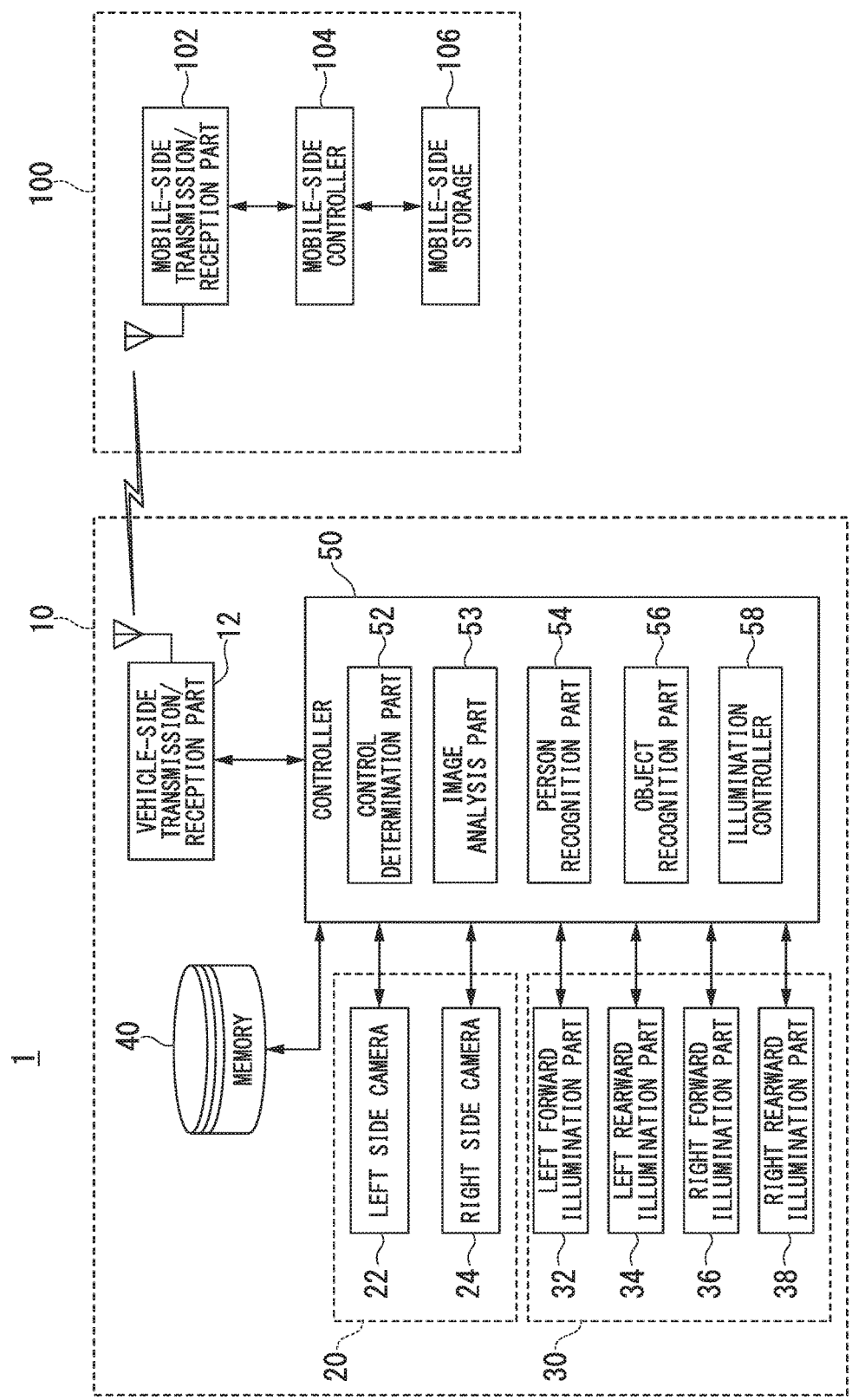
FIG. 1 is a view showing a configuration of an in-vehicle equipment control system.

FIG. 1 is a view showing a configuration of an in-vehicle equipment control system 1. The in-vehicle equipment control system 1 includes in-vehicle equipment 10 mounted on a vehicle, and a mobile terminal 100. The in-vehicle equipment 10 includes a vehicle-side transmission/reception part 12, an imaging part 20, an illumination part 30, a storage 40 and a controller 50.

The vehicle-side transmission/reception part 12 periodically transmits a request signal to surroundings of the vehicle, and receives a response signal from the mobile terminal 100. The imaging part 20 includes, for example, a left side camera 22 and a right side camera 24. Each of the left side camera 22 and the right side camera 24 is a digital camera using solid-state imaging elements such as a charge coupled device (CCD), a complementary metal oxide semiconductor (CMOS), and so on. The left side camera 22 and the right side camera 24 repeatedly image surroundings of the vehicle M to which they belong, for example, periodically.

Figure 2:
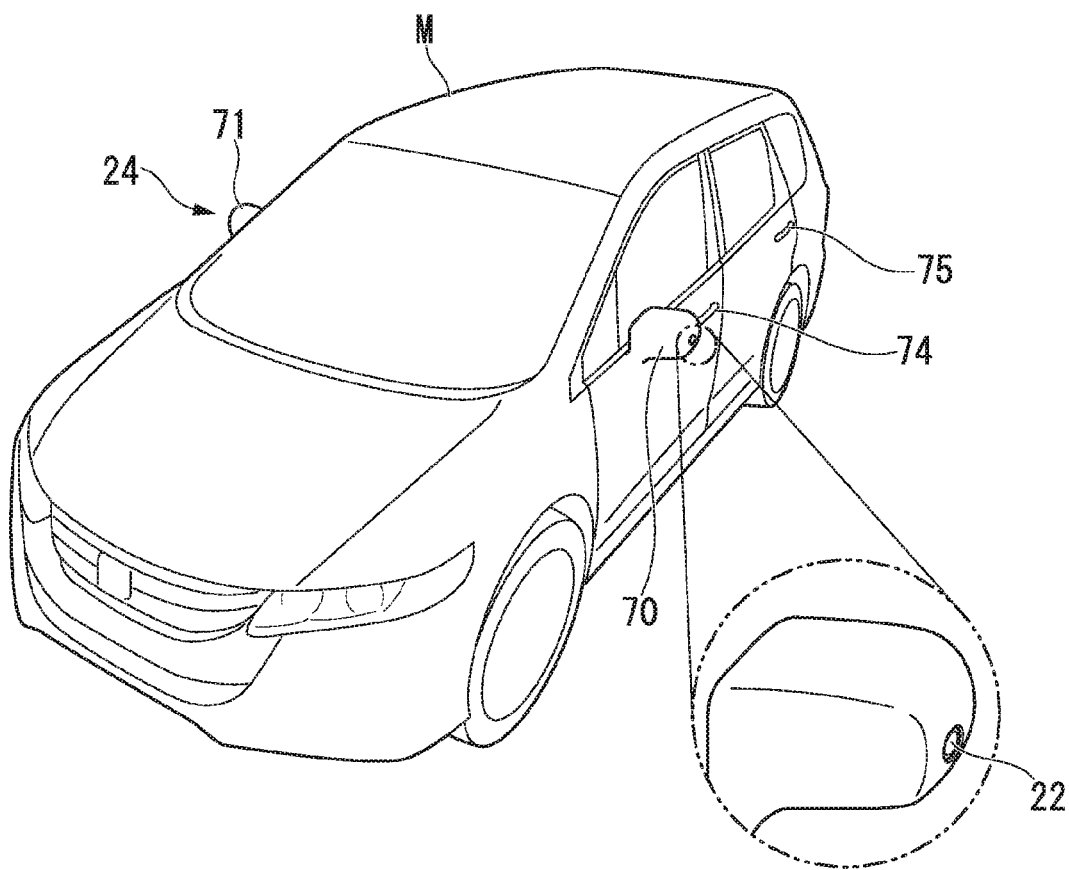
FIG. 2 is a perspective view of a vehicle.

FIG. 2 is a perspective view of the vehicle M. The left side camera 22 is installed at the vehicle M to image a leftward direction when seen from the vehicle M. The left side camera 22 is installed at, for example, a left side view mirror 70 to image a left side when seen from the vehicle. The right side camera 24 is installed at the vehicle M to image a rightward direction when seen from the vehicle. The right side camera 24 is installed at, for example, a right side view mirror 71 to image a right side when seen from the vehicle M. An imaging direction or an imaging range of the left side camera 22 and the right side camera 24 may be varied, for example, by control of the controller 50.

The illumination part 30 is installed at a fixed position of the vehicle M. The illumination part 30 includes, for example, a left forward illumination part 32, a left rearward illumination part 34, a right forward illumination part 36 and a right rearward illumination part 38. The left forward illumination part 32 is installed at, for example, a door handle 74 installed at the exterior of a front door of a left side of the vehicle M. The left rearward illumination part 34 is installed at, for example, a door handle 75 installed at the exterior of a rear door of the left side of the vehicle M. The right forward illumination part 36 is installed at, for example, a door handle installed at the exterior of a front door of a right side of the vehicle M. The right rearward illumination part 38 is installed at, for example, a door handle installed at the exterior of a rear door of the right side of the vehicle M.

Figure 3:
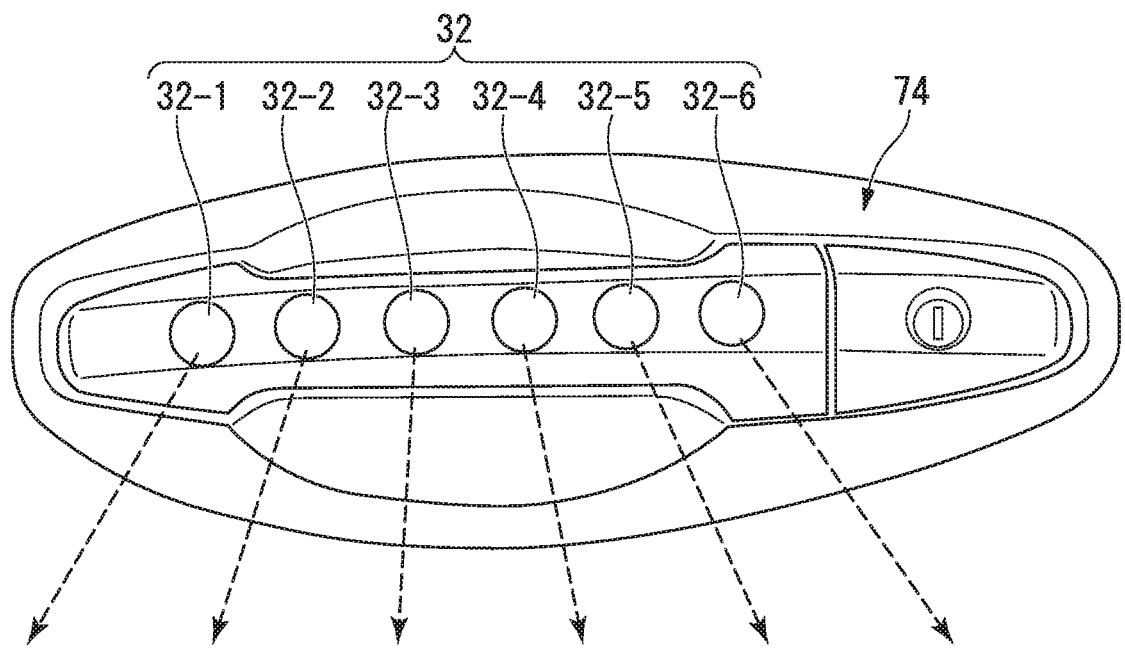
FIG. 3 is an enlarged view of a door handle.

FIG. 3 is an enlarged view of the door handle 74. The left forward illumination part 32 has, for example, a plurality of lighting parts 32-1 to 32-6, and the plurality of lighting parts are installed at a front surface of the door handle 74. The plurality of lighting parts radiate light to a ground surface in the vicinity of the door of the front side or the rear side of the left side of the vehicle M.

In addition, the plurality of lighting parts radiates light, for example, in different directions.

Further, radiation ranges of light of the plurality of lighting parts may be varied in upward, downward, leftward and rightward directions by control of the controller 50. In addition, the plurality of lighting parts may include lighting parts configured to emit light having colors of at least a first wavelength and a second wavelength. In addition, the left rearward illumination part 34, the right forward illumination part 36 and the right rearward illumination part 38 are also installed at the door handle and turned on to radiate light to the ground surface in the vicinity of the door similar as the left forward illumination part 32.

The storage 40 is realized by a read only memory (ROM), a random access memory (RAM), a hard disk drive (HDD), a flash memory, or the like. A program or the like realized by the controller 50 is stored in the storage 40.

The controller 50 includes a control determination part 52 (an imaging controller), an image analysis part 53, a person recognition part 54, an object recognition part 56 and an illumination controller 58. Some or all of the control determination part 52, the image analysis part 53, the person recognition part 54, the object recognition part 56 and the illumination controller 58 may be software function units that function as a processor such as a central processing unit (CPU) or the like that executes the program. In addition, some or all of these may be hardware function units such as a large scale integration (LSI), an application specific integrated circuit (ASIC), a field-programmable gate array (FPGA), and so on.

The control determination part 52 causes the imaging part 20 to image the outside of the vehicle M when a response signal by the mobile terminal 100 is received. The image analysis part 53 analyzes an image imaged by the imaging part 20.

The person recognition part 54 recognizes the presence of an hazardous object on the basis of the analyzed result of the image analysis part 53. The hazardous object is an object that a user who wants to ride in the vehicle M should pay attention. The hazardous object is, for example, a puddle, an irregularity in a road, or the like. The illumination controller 58 controls the illumination part 30 to perform illumination in different ways when the hazardous object is recognized by the object recognition part 56 and when no hazardous object is recognized. Processing of the controller 50 will be described in detail.

The mobile terminal 100 may be a mobile phone such as a smart phone or the like, a tablet terminal, or the like, to which the following function is provided by installing an application program, or a dedicated terminal device such as an electronic key or the like. The mobile terminal 100 includes a mobile-side transmission/reception part 102, a mobile-side controller 104 and a mobile-side storage 106. When a request signal transmitted from the vehicle M is received, the mobile-side transmission/reception part 102 transmits a response signal to the vehicle M according to the received request signal. The mobile-side controller 104 transmits a response signal including ID information stored in the mobile-side storage 106 to the vehicle-side transmission/reception part 12. The ID information set to its own terminal is stored in the mobile-side storage 106.

Figure 4:
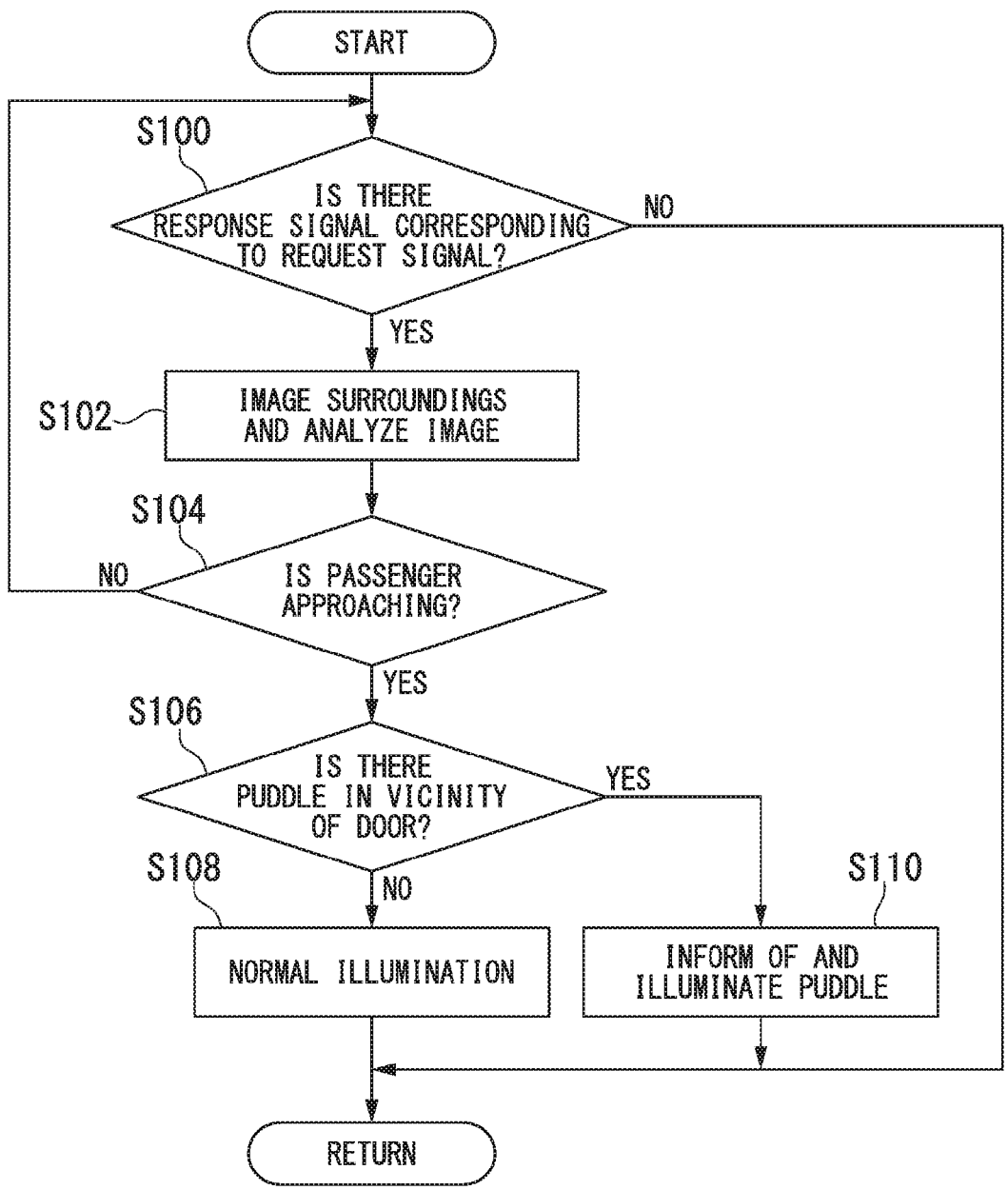
FIG. 4 is a flowchart showing a flow of processing that is performed by the in-vehicle equipment.

FIG. 4 is a flowchart showing a flow of processing performed by the in-vehicle equipment 10. First, the control determination part 52 of the controller 50 determines whether a response signal with respect to a request signal transmitted by the vehicle-side transmission/reception part 12 is received from the mobile terminal 100 (step S100). When the response signal is not received from the mobile terminal 100, one routine of the flow chart is terminated. When the response signal is received from the mobile terminal 100, the control determination part 52 causes the imaging part 20 to image surroundings of the vehicle and the image analysis part 53 analyzes the imaged image (step S102). Then, the imaging part 20 images surroundings of the vehicle M at a predetermined period. In addition, the image analysis part 53 analyzes the image imaged by the imaging part 20.

Figure 5:
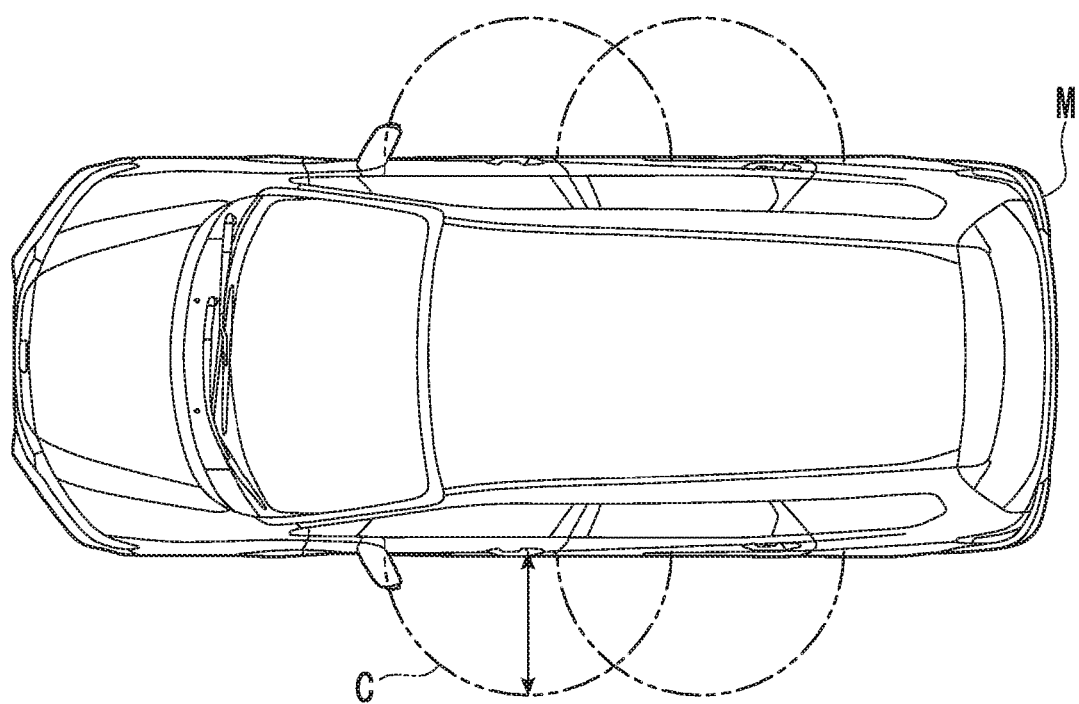
FIG. 5 is a view for describing a request signal and a response signal.

FIG. 5 is a view for describing a request signal and a response signal. The vehicle-side transmission/reception parts 12 are installed at, for example, the door handles of the exterior of the vehicle M. For example, a transmission range of the request signal transmitted by the vehicle-side transmission/reception part 12 is arbitrarily set. As shown, a transmission range C of the request signal is, for example, a range of tens to hundreds of cm about the door handles of the vehicle M.

When a user who carries the mobile terminal 100 is within the transmission range of the request signal, the mobile-side transmission/reception part 102 receives the request signal. The mobile-side controller 104 transmits the response signal including the ID information stored in the storage to the vehicle-side transmission/reception part 12.

The control determination part 52 of the vehicle M determines whether the ID information included in the response signal received by the vehicle-side transmission/reception part 12 coincides with the ID information stored in the storage 40. When the ID information included in the response signal received by the vehicle-side transmission/reception part 12 coincides with the ID information stored in the storage 40, the control determination part 52 determines that the user who carries the mobile terminal 100 is an authorized user of the vehicle M. When the ID information included in the response signal received by the vehicle-side transmission/reception part 12 does not coincide with the ID information stored in the storage 40, the control determination part 52 determines that the user who carries the mobile terminal 100 is not an authorized user of the vehicle M. In the processing, the control determination part 52 determines that there is the response signal with respect to the request signal when the user is the authorized user of the vehicle M.

In addition, the control determination part 52 determines in which direction the user who carries the mobile terminal 100 is located with respect to the vehicle M on the basis of the received result of the response signal received by the vehicle-side transmission/reception part 12. The control determination part 52 specifies the vehicle-side transmission/reception part 12 that receives the response signal, among the vehicle-side transmission/reception parts 12 installed at the plurality of door handles. The control determination part 52 determines that the user is in a communication range of the specified vehicle-side transmission/reception part 12. In addition, the control determination part 52 determines that the user is at a position at which the transmission ranges of the two vehicle-side transmission/reception parts 12 that receive the response signal overlap each other when the response signal is received by the two vehicle-side transmission/reception parts 12.

The control determination part 52 starts the imaging part 20 configured to image a direction in which a user is present when the response signal is received. The control determination part 52 starts the left side camera 22 when the user is present at the left side of the vehicle. The control determination part 52 starts the right side camera 24 when the user is present at the right side of the vehicle. The imaging part 20 images surroundings of the vehicle M upon starting and at predetermined time intervals.

Starting the imaging part 20 involves changing a power supply of the imaging part 20 from an OFF state to an ON state. In addition, starting the imaging part 20 involves changing to a wake-up state when the imaging part 20 is in a sleep state. In addition, starting the imaging part 20 may involve changing the imaging part 20 to the ON state or the wake-up state and adjusting an imaging direction of the imaging part 20 to a direction in which the user is present.

Next, the person recognition part 54 determines whether the user is approaching the vehicle M or not on the basis of the analyzed result of the image analysis part 53 of step S102 (step S104). The person recognition part 54 extracts, for example, characteristics estimated to display the same user among characteristics extracted from the images of the different imaging frames. For example, the person recognition part 54 estimates the moving direction of the user on the basis of an extracted moving trajectory of the characteristics estimated to display the same user. The person recognition part 54 determines whether the user is approaching the vehicle M or not on the basis of the estimated moving direction of the user.

When it is determined that the user is not approaching, the system returns to processing of step S100. When it is determined that the user is approaching, the object recognition part 56 determines whether a puddle is present in the vicinity of the door that the user is approaching on the basis of the image analyzed by the image analysis part 53 in step S102 (step S106). The vicinity of the door is a boarding position serving as a place at which the user is present when the user boards the vehicle M. The boarding position is a region previously stored in the storage 40. In addition, the boarding position may be individually set to the doors included in the vehicle M.

The object recognition part 56 determines whether a puddle is present by determining whether a preset brightness gradient is present, whether a time variation in the preset brightness gradient is present, or the like, in the analyzed result of the image analysis part 53. In addition, the imaging part 20 may include a first camera configured to image a visual field image via a vertical polarization filter, and a second camera configured to image a visual field image via a horizontal polarization filter. The object recognition part 56 detects a road surface state using polarization properties of the vertical polarization image and the horizontal polarization image imaged by the first and second cameras. The object recognition part 56 detects a puddle, a position of the puddle, and a region in which the puddle is present on the basis of intensity of a vertical polarization ingredient based on brightness information of the vertical polarization image and intensity of a horizontal polarization ingredient based on brightness information of the horizontal polarization image.

For example, when the puddle is recognized, the object recognition part 56 extracts the boarding position (region) in which the recognized puddle is present among a plurality of boarding positions (regions). The object recognition part 56 extracts the position in which the puddle is present among the set boarding positions, and outputs the extracted result to the illumination controller 58. The object recognition part 56 extracts at which boarding position the puddle is present corresponding to a door among the front left door, the rear left door, the front right door and the rear right door, and outputs the extracted result to the illumination controller 58. In addition, the object recognition part 56 extracts the range in which the puddle is present among the regions set to the boarding positions, and outputs positional information indicating the extracted range of the puddle to the illumination controller 58.

When no puddle is present in the vicinity of the door that the user is approaching, the illumination controller 58 controls the illumination part 30 to illuminate the vicinity of the door that the user is approaching (step S108). When the puddle is present in the vicinity of the door that the user is approaching, the illumination controller 58 controls the illumination part 30 to illuminate the puddle in consideration of the presence of the puddle (step S110). Accordingly, processing of the flowchart is terminated.

Here, the illumination states when no puddle is present in the vicinity of the door and when the puddle is present in the vicinity of the door will be described. The illumination controller 58 controls the illumination part 30 to perform the illumination in a state in which the user can discriminate a region in which the recognized hazardous object is present and a region in which the hazardous object is not present, when the hazardous object is recognized by the object recognition part 56.

Figure 6:
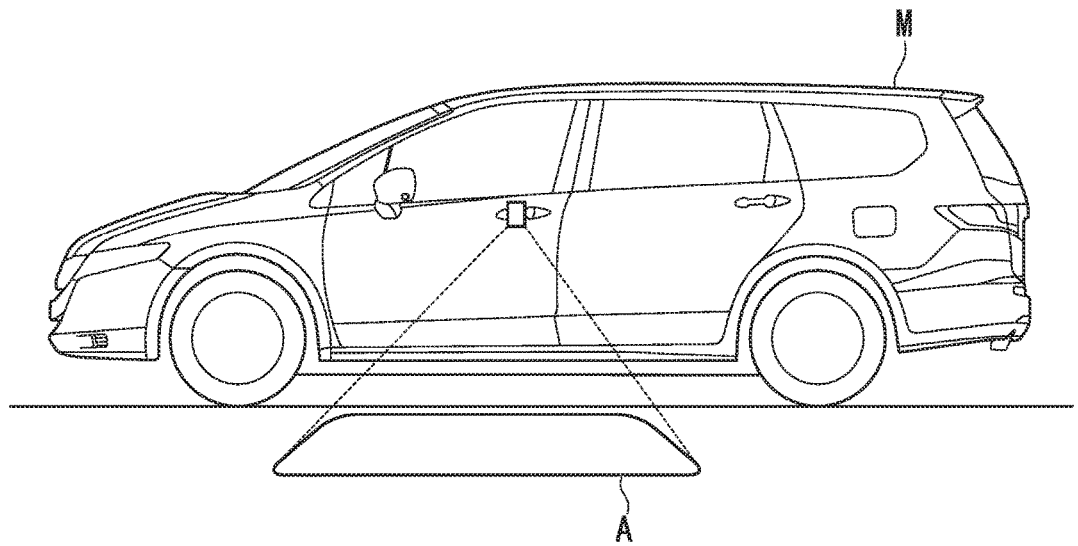
FIG. 6 is a view showing a state in which a ground surface is illuminated when there is no puddle in the vicinity of a door.

FIG. 6 is a view showing a state in which a ground surface is illuminated when no puddle is present in the vicinity of the door. For example, when the user is approaching the front door of the left side of the vehicle M, the illumination controller 58 controls the illumination part 30 to illuminate an illumination range A in the vicinity of the front door of the left side on the basis of the position and the moving direction of the user recognized by the person recognition part 54. Accordingly, the user can recognize the boarding position of the vehicle M.

Figure 7:
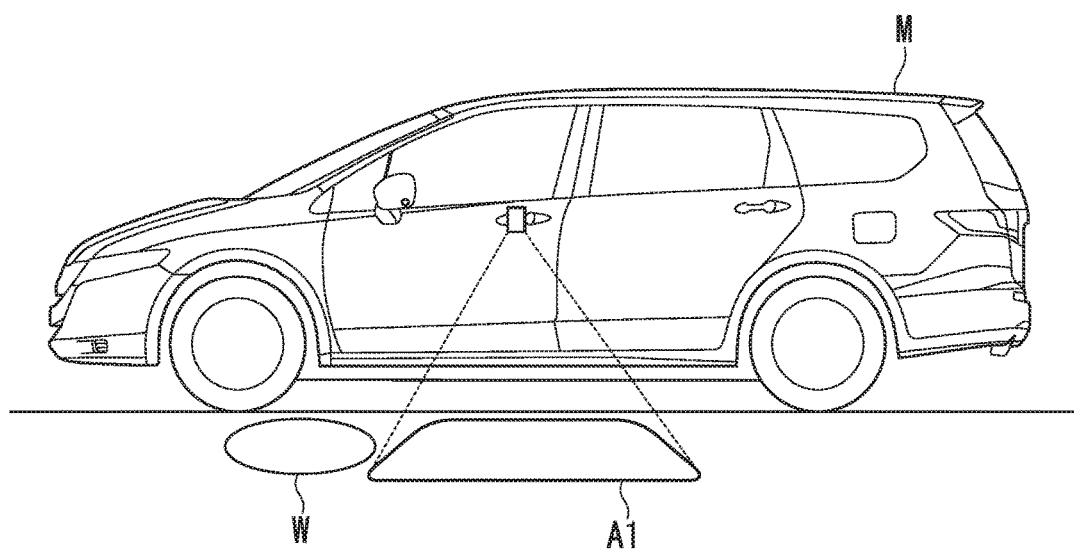
FIG. 7 is a view showing a state (1) in which a ground surface is illuminated when there is a puddle in the vicinity of a front door of a left side.

FIG. 7 is a view showing a state (1) in which a ground surface is illuminated when a puddle is present in the vicinity of the front door of the left side. For example, when the user is approaching the front door of the left side of the vehicle M, the illumination controller 58 controls the illumination part 30 to radiate light to an illumination range A1 in the vicinity of the front door of the left side except for a puddle W on the basis of the position and the moving direction of the user recognized by the person recognition part 54 and a boarding/deboarding position extracted by the object recognition part 56. In this way, the in-vehicle equipment control system 1 informs a user of the presence of a hazardous object in the vicinity of the vehicle. Accordingly, the user can recognize the region in which the puddle W is present and can avoid the puddle W when boarding the vehicle M.

Figure 8:
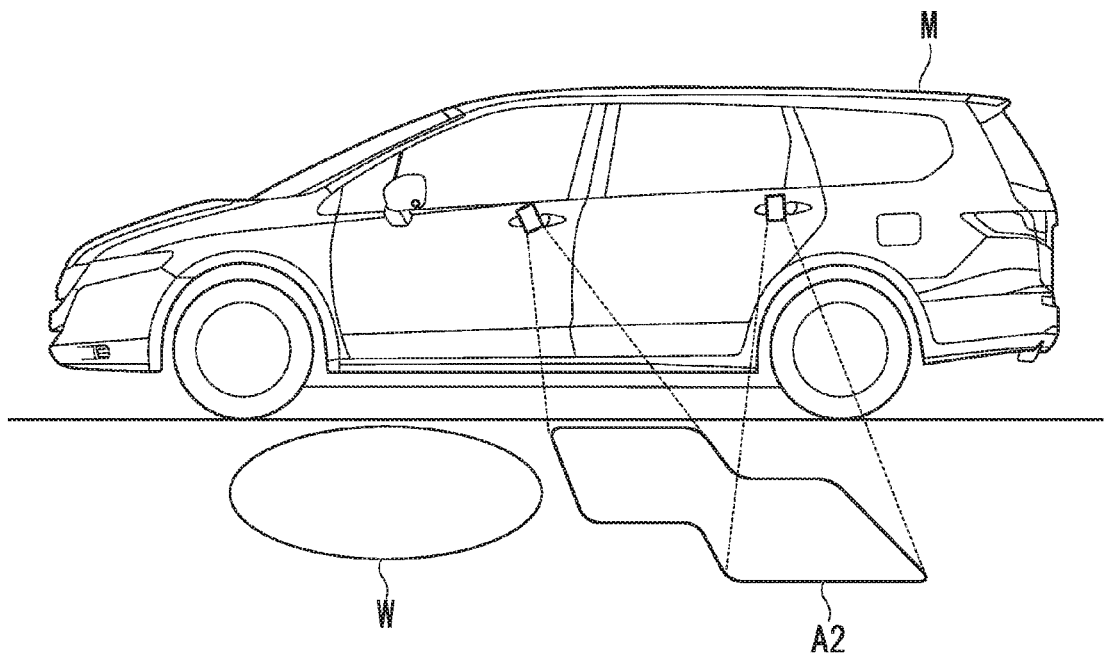
FIG. 8 is a view showing a state (2) in which a ground surface is illuminated when there is a puddle in the vicinity of the front door of the left side.

FIG. 8 is a view showing a state (2) in which a ground surface is illuminated when a puddle is present in the vicinity of the front door of the left side. For example, when the user is approaching the front door of the left side of the vehicle M, the illumination controller 58 controls the illumination part 30 to radiate light showing a guide path A2 that does not include the puddle W, from a position of the user or a direction in which the user is present to the vicinity of the front door of the left side. In this case, for example, the illumination controller 58 may control the illumination parts 30 installed at the doors of the front side and the rear side of the left side of the vehicle M to perform the illumination to show the guide path A2. In this way, the in-vehicle equipment control system 1 informs the user of the presence of the hazardous object in the vicinity of the vehicle.

Accordingly, the user can avoid the puddle W and board the vehicle M by advancing to the boarding position of the vehicle M along the guide path A2.

Figure 9:
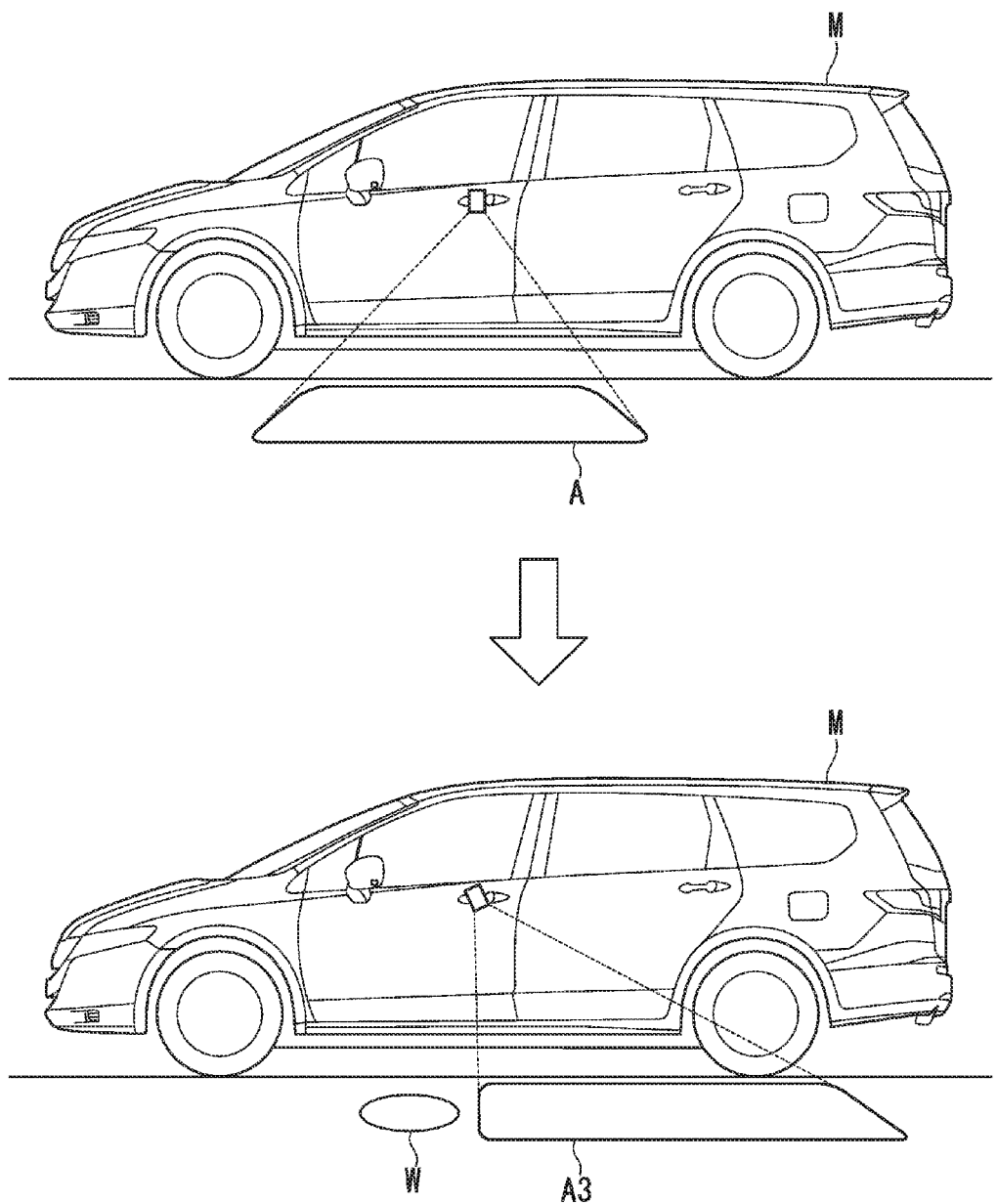
FIG. 9 is a view showing a state (3) in which a ground surface is illuminated when there is a puddle in the vicinity of the front door or the left side.

FIG. 9 is a view showing a state (3) in which a ground surface is illuminated when a puddle is present in the vicinity of the front door of the left side. When the user is approaching the front door of the left side of the vehicle M, as shown in an upper view of FIG. 9, the illumination controller 58 controls the illumination part 30 to illuminate the illumination range A in the vicinity of the front door of the left side. After a predetermined time from the illumination of the illumination range A, and as shown in a lower view of FIG. 9, the illumination controller 58 controls the illumination part 30 to radiate light to a region excluding the vicinity of the puddle W. For example, the illumination controller 58 controls the illumination part 30 to shift the illumination range from the illumination range A including the puddle W to an illumination range A3 excluding the puddle W. In this way, the in-vehicle equipment control system 1 informs the user of the presence of the hazardous object in the vicinity of the vehicle. Accordingly, the user can recognize the boarding/deboarding position that enables the user to avoid the puddle W and the region in which the puddle W is present.

Figure 10:
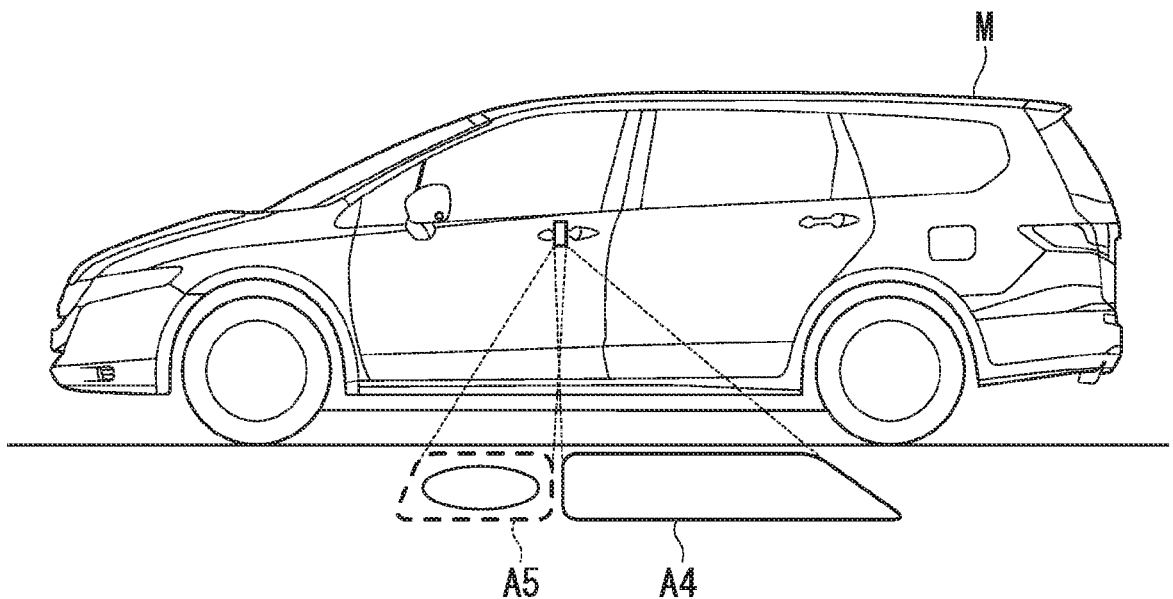
FIG. 10 is a view showing a state (4) in which a ground surface is illuminated when there is a puddle in the vicinity of the front door or the left side.

FIG. 10 is a view showing a state (4) in which a ground surface is illuminated when a puddle is present in the vicinity of the front door of the left side. When the user is approaching the front door of the left side of the vehicle M, the illumination controller 58 controls the illumination part 30 to irradiate an illumination range A4 in the vicinity of the front door of the left side excluding the puddle W with light of a first wavelength. In addition, the illumination controller 58 controls the illumination part 30 to irradiate an illumination range A5 in the vicinity of the puddle W with light of a second wavelength (for example, red light). It is possible to warn the user the presence of the puddle W by radiating the region in which the puddle W is present with light having a wavelength different from that of the region in which the puddle W is not present.

Further, when at least one boarding position at which the hazardous object is disposed is extracted from the plurality of boarding positions by the object recognition part 56, the illumination controller 58 may control the illumination part 30 to perform the illumination at the extracted boarding position in a way different from that performed at a boarding position that the hazardous object is not extracted. For example, when the user recognized by the person recognition part 54 is approaching the left side of the vehicle, in the case a boarding position where the puddle is disposed is not extracted by the object recognition part 56, the illumination controller 58 controls the left forward illumination part 32 and the left rearward illumination part 34 to illuminate all of the boarding positions of the left side of the vehicle M.

On the other hand, when a boarding position where the puddle is disposed is extracted by the object recognition part 56, the illumination controller 58 performs control with respect to the left forward illumination part 32 or the left rearward illumination part 34 of the illumination part 30 configured to illuminate the boarding position at which the puddle is present (for example, the left forward illumination part 32) such that the user can discriminate the region where the recognized puddle is present and the region where the puddle is not present. The illumination controller 58 performs control with respect to the left forward illumination part 32 or the left rearward illumination part 34 of the illumination part 30 configured to illuminate the boarding position at which the puddle is not present (for example, the left rearward illumination part 34) to illuminate all of the boarding positions. Accordingly, it is possible to make the user recognize whether the hazardous object is present at each of the boarding positions corresponding to each of the doors.

According to the above-mentioned first embodiment, the in-vehicle equipment control system 1 controls the illumination part 30 to perform the illumination such that the user can discriminate the region in which the hazardous object is present and the region in which the hazardous object is not present when the hazardous object is present in the vicinity of the doors of the vehicle M. As a result, the in-vehicle equipment control system 1 can inform the user of the presence of the hazardous object in the vicinity of the vehicle.

Second Embodiment

Hereinafter, a second embodiment will be described. The in-vehicle equipment control system 1 of the first embodiment controls the illumination part to perform the illumination such that the user can discriminate the region in which the hazardous object is present and the region in which the hazardous object is not present when the hazardous object is present in the vicinity of the doors of the vehicle M. An in-vehicle equipment control system 1A of the second embodiment further displays a position of a hazardous object on a display image of a mobile terminal 100A such that a user can recognize the hazardous object, in addition to the functions of the first embodiment. Hereinafter, differences from the in-vehicle equipment control system 1 of the first embodiment will be mainly described.

The object recognition part 56 of the vehicle M acquires positional information of a puddle when the puddle is present in the vicinity of the doors of the vehicle M. The positional information is, for example, positional information indicating an edge of the puddle with respect to the vehicle M. The vehicle-side transmission/reception part 12 transmits the positional information of the puddle acquired by the object recognition part 56 to the mobile terminal 100A.

Figure 11:
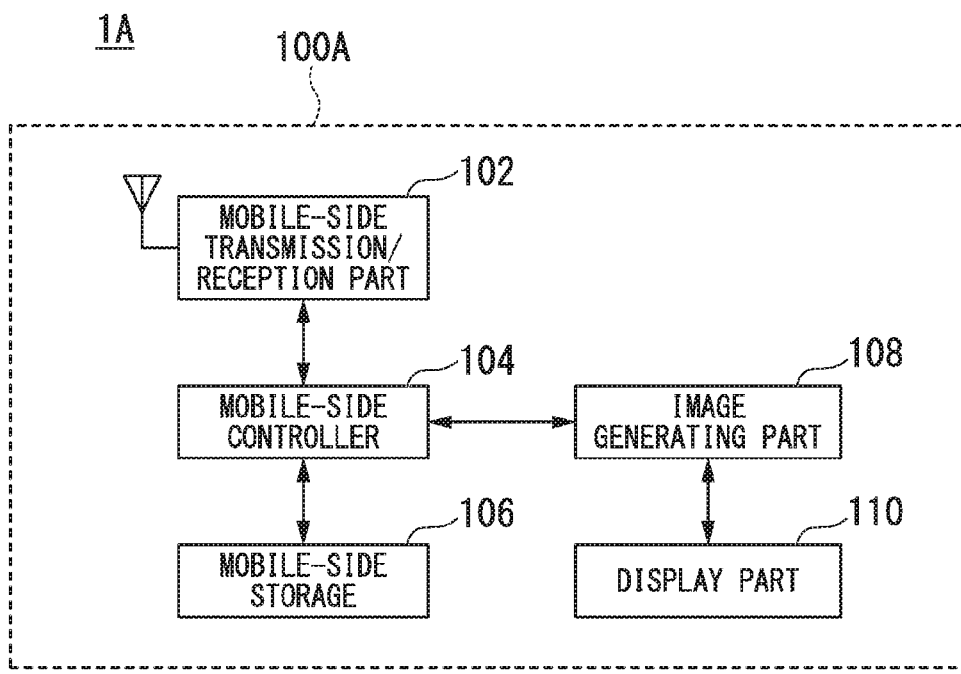
FIG. 11 is a view showing a configuration of a mobile terminal of an in-vehicle equipment control system of a second embodiment.

FIG. 11 is a view showing a configuration of the mobile terminal 100A of the in-vehicle equipment control system 1A of the second embodiment. The mobile terminal 100A further includes an image generating part 108 and a display part 110 in addition to the functions of the mobile terminal 100 of the first embodiment.

The mobile-side transmission/reception part 102 transmits and receives information by performing communication at predetermined periods in a state in which connection to the mobile-side transmission/reception part 102 of the vehicle M is securely established. The mobile-side transmission/reception part 102 acquires the positional information of the puddle transmitted from the vehicle-side transmission/reception part 12 of the vehicle M. In addition, the mobile-side transmission/reception part 102 acquires the positional information of the user transmitted from the vehicle-side transmission/reception part 12.

The image generating part 108 performs processing on the basis of the information stored in the mobile-side storage 106. The image generating part 108 processes the information acquired from the mobile-side controller 104 and information previously stored in the mobile-side storage 106 to generate an image. Processing of the image generating part 108 will be described below in detail.

The display part 110 is configured by overlapping a display part such as a liquid crystal display (LCD), an organic electroluminescence (EL), or the like, and an input unit configured to detect a touch position of an operator using a coordinate detection mechanism. The display part 110 displays a graphical user interface (GUI) for operation. The input unit generates an operation signal showing that a touch operation on a GUI switch is performed when a touch operation, a flick operation, a swipe operation, or the like on the GUI switch is detected, and outputs the operation signal to the mobile-side controller 104. The display part 110 displays the image generated by the image generating part 108.

Figure 12:
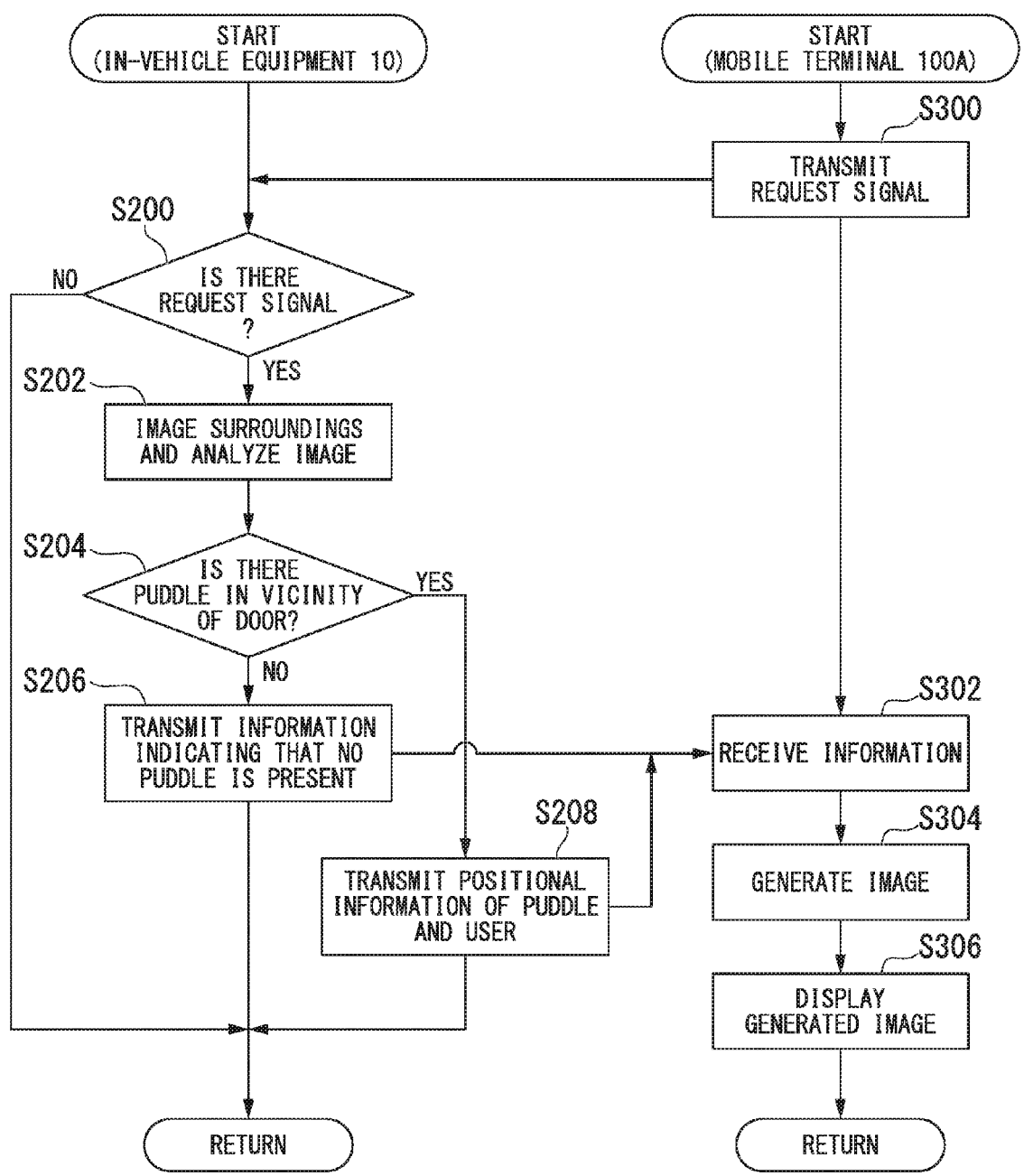
FIG. 12 is a flowchart showing a flow of processing performed by the in-vehicle equipment control system of the second embodiment.

FIG. 12 is a flowchart showing a flow of processing performed by the in-vehicle equipment control system 1A of the second embodiment. Further, the present processing is, for example, a processing performed in parallel with the processing performed by the in-vehicle equipment 10 of the first embodiment.

First, the mobile-side controller 104 transmits the required signal to the vehicle-side transmission/reception part 12 of the vehicle M at preset periods or on the basis of the operation with respect to the input unit of the mobile terminal 100A by the user (step S300).

Next, the controller 50 determines whether the required signal transmitted from the mobile terminal 100A is received (step S200). When the required signal is not received from the mobile terminal 100A, one routine of the flowchart is terminated. When the required signal is received from the mobile terminal 100A, the control determination part 52 of the controller 50 causes the imaging part 20 to image surroundings of the vehicle M and the image analysis part 53 analyzes the imaged image (step S202).

Next, the object recognition part 56 determines whether the puddle is present in the vicinity of the door of the vehicle M on the basis of the image analyzed by the image analysis part 53 in step S202 (step S204). When the puddle is not present in the vicinity of the door of the vehicle M, the controller 50 transmits the information indicating that the puddle is not present in the vicinity of the door of the vehicle M (step S206). When the puddle is present in the vicinity of the door of the vehicle M, the controller 50 transmits the positional information of the puddle to the mobile terminal 100A (step S208). The positional information of the puddle is, for example, positional information indicating an edge of the puddle with respect to the vehicle M.

The mobile terminal 100A receives the information transmitted from the in-vehicle equipment 10 (step S302). Next, the image generating part 108 of the mobile terminal 100A generates an image on the basis of the information received in step S302 and the information stored in the mobile-side storage 106 (step S304). For example, the image generating part 108 generates an image showing the puddle on the basis of the acquired positional information of the puddle. The image generating part 108 synthesizes the image of the vehicle M previously stored in the mobile-side storage 106 and the generated image of the puddle. Next, the image generating part 108 displays the image showing the position of the puddle generated in step S304 on the display part 110 (step S306). Further, when the information indicating that the puddle is not present is received in step S302, the image generating part 108 generates an image showing information indicating that the puddle is not present, and displays the generated image on the display part 110. Accordingly, processing of the flowchart is terminated.

Figure 13:
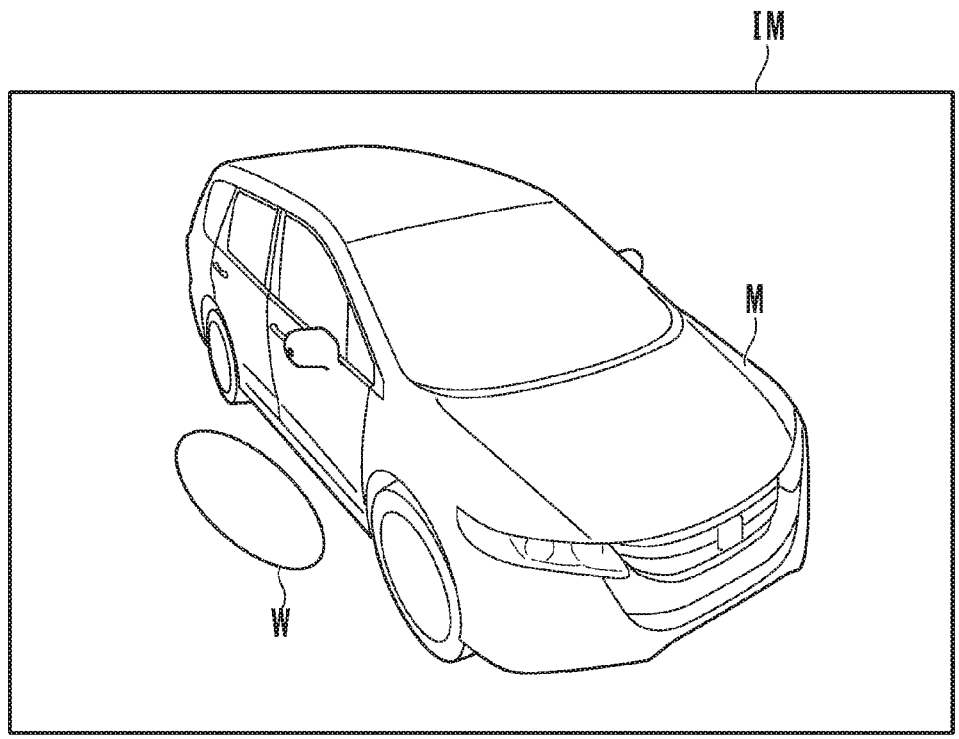
FIG. 13 is a view showing an example of an image displayed on a display part.

FIG. 13 is a view showing an example of an image IM displayed on the display part 110. For example, the image generating part 108 generates an image in which a state in which the vehicle M is seen in a perspective direction and the puddle W correspond to each other. The mobile-side controller 104 displays a position of the puddle generated by the image generating part 108 with respect to the vehicle M and the image including the state in which the vehicle M is seen in a perspective view on the display part 110. Accordingly, the in-vehicle equipment control system 1A can warn the user the presence of the puddle in the vicinity of the vehicle M in advance. In addition, the user can recognize the presence of the puddle in the vicinity of the vehicle M and the position of the puddle with respect to the vehicle M in advance using the mobile terminal 100A.

Further, in the example shown, the image generating part 108 may generate an image showing the vehicle M and the puddle in addition to the information indicating the position or the moving direction of the user. For example, in this case, the mobile terminal 100A includes a global navigation satellite system (GNSS) reception unit configured to receive electric waves from a plurality of satellites that constitute the Global Positioning System (GPS) or the like. The mobile terminal 100A includes a position specifying unit configured to specify a position of its own terminal by performing a positioning operation on the basis of the received electric waves. In addition, similarly, the vehicle M also includes a GNSS reception unit and a position specifying unit.

For example, the controller 50 of the in-vehicle equipment 10 transmits the information indicating the position of the vehicle M and an orientation of a vehicle body together with the positional information of the puddle to the mobile terminal 100A. The image generating part 108 of the mobile terminal 100A generates an image showing the vehicle M and the puddle in the direction seen from the position at which the user is present on the basis of the information indicating the position of the vehicle M and an orientation of the vehicle body and the position of the user specified by the position specifying unit of the mobile terminal 100A. When the user is positioned in a front right direction of the vehicle M, the image generating part 108 generates, for example, as shown in FIG. 13, the image showing the vehicle M and the puddle when seen by the user in that direction, and displays the generated image on the display part 110. Accordingly, the user can recognize the vehicle M and the puddle that will be visible when he or she actually approaches the vehicle M, and recognize the position of the puddle intuitively.

Figure 14:
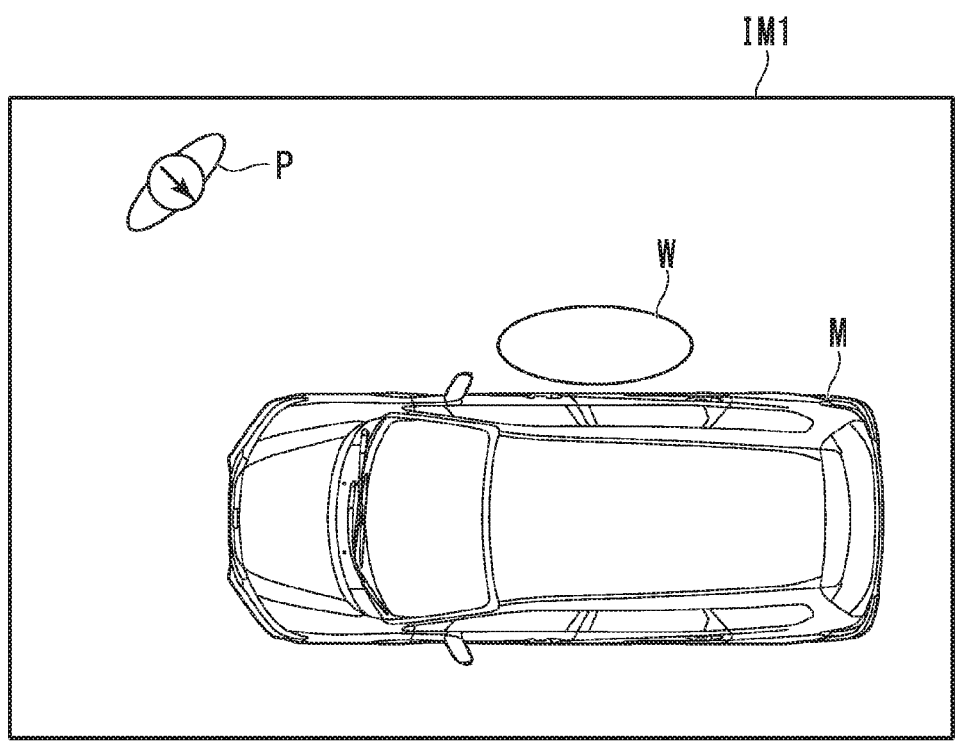
FIG. 14 is a view showing an example of a separate image displayed on the display part.

FIG. 14 is a view showing an example of a different image IM1 displayed on the display part 110. For example, the vehicle M and the puddle W that is present in the vicinity of and the vehicle M are correspondingly displayed on the display part 110. For example, the image displayed on the display part 110 is an image showing the vehicle M and the puddle from above. In addition, as shown, the image generating part 108 may include the position P and the moving direction of the user in the image showing the vehicle M and the puddle. Accordingly, the in-vehicle equipment control system 1A can warn the user the presence of the puddle in the vicinity of the vehicle M in advance. In addition, the user can recognize the presence of the puddle in the vicinity of the vehicle M and the position of the puddle with respect to the vehicle M in advance using the mobile terminal 100A.

According to the above-mentioned second embodiment, the in-vehicle equipment control system 1A transmits the positional information of the puddle with respect to the vehicle M to the mobile terminal 100A when the puddle is present in the vicinity of the vehicle M. The mobile terminal 100A displays the image showing the vehicle M and the puddle present in the vicinity of the vehicle M on the display part 110 on the basis of the positional information of the puddle. Accordingly, the system can warn the user the presence of the puddle in the vicinity of the vehicle M in advance. In addition, the user can recognize the presence of the puddle in the vicinity of the vehicle M and the position of the puddle with respect to the vehicle M in advance using the mobile terminal 100A.

While the aspects of performing the present invention have been described above with reference to the embodiments, the present invention is not limited to the embodiments but various modifications and substitutions may be made without departing from the scope of the present invention.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An in-vehicle equipment control system comprising:
   a mobile terminal configured to receive a request signal transmitted from a vehicle and transmit a response signal to the vehicle according to the received request signal; and
   in-vehicle equipment having:
   an imaging part configured to image surroundings of the vehicle;
   an illumination part installed at a fixed position of the vehicle and configured to radiate light;
   a transmission/reception part configured to periodically transmit a request signal to the surroundings of the vehicle and receive a response signal from the mobile terminal;
   an imaging controller configured to cause the imaging part to image an outside of the vehicle when the response signal is received by the transmission/reception part;
   an object recognition part configured to recognize a presence of a hazardous object on the basis of the image imaged by the imaging part; and
   an illumination controller configured to control the illumination part to perform illumination in different ways when the hazardous object is recognized by the object recognition part and when the hazardous object is not recognized,
   wherein the object recognition part determines whether the hazardous object is recognized at a boarding/deboarding position of the vehicle,
   wherein, when a hazardous object is recognized by the object recognition part, the illumination controller causes the illumination part to illuminate a guide path, which guides a user who carries the mobile terminal to the boarding/deboarding position of the vehicle, at a region in which the hazardous object is not present.

2. The in-vehicle equipment control system according to claim 1,
   wherein the in-vehicle equipment further comprises a person recognition part configured to recognize a presence of a person who approaches the vehicle on the basis of the image imaged by the imaging part, and
   wherein the object recognition part performs processing of recognizing the presence of the hazardous object when a person who approaches the vehicle is recognized by the person recognition part.

3. The in-vehicle equipment control system according to claim 1,
   wherein the illumination part is able to change a region that radiates light, and
   wherein the illumination controller controls the illumination part to radiate light to a region except for the recognized hazardous object when the hazardous object is recognized by the object recognition part.

4. The in-vehicle equipment control system according to claim 1,
   wherein the illumination part is able to change a direction in which light is radiated, and
   wherein, when the hazardous object is recognized by the object recognition part, the illumination controller controls the illumination part not to illuminate the hazardous object by changing a direction in which the illumination part illuminates.

5. The in-vehicle equipment control system according to claim 1,
   wherein the illumination part has at least two light sources to illuminate different directions, and
   wherein, when the hazardous object is recognized by the object recognition part, the illumination controller controls the illumination part to prohibit emission of the light source in a direction in which the hazardous object is illuminated and turn on other light sources among the light sources provided in the illumination parts.

6. The in-vehicle equipment control system according to claim 1,
   wherein the illumination part has at least a first emission part configured to emit light of a first wavelength and a second emission part configured to emit light of a second wavelength, and
   wherein, when the hazardous object is recognized by the object recognition part, the illumination controller controls the illumination part to cause the first emission part to illuminate the hazardous object and cause the second emission part to illuminate other region.

7. The in-vehicle equipment control system according to claim 1,
   wherein the object recognition part extracts a region where a position of the recognized hazardous object is disposed among a predetermined plurality of regions corresponding to each of boarding/deboarding positions of a plurality of doors provided in the vehicle, and
   wherein, when at least one region the hazardous object is disposed is extracted by the object recognition part, the illumination controller controls the illumination part to perform illumination on the extracted region in a different way from a way performed on the non-extraction region.

8. The in-vehicle equipment control system according to claim 1,
   wherein the hazardous object is a puddle.

9. The in-vehicle equipment control system according to claim 1,
wherein the vehicle performs communication with the mobile terminal at predetermined periods in a state in which connection to the mobile terminal is securely established, and
the mobile terminal has a display image that displays an image showing a position of the hazardous object on the basis of the communication result.

* * * * *